(12) United States Patent
Luo

(10) Patent No.: US 12,443,752 B2
(45) Date of Patent: Oct. 14, 2025

(54) SYSTEMS AND METHODS FOR DATA MASKING

(71) Applicant: SHANGHAI UNITED IMAGING METAHEALTHCARE CO., LTD., Shanghai (CN)

(72) Inventor: Jian Luo, Wuhan (CN)

(73) Assignee: SHANGHAI UNITED IMAGING METAHEALTHCARE CO., LTD., Shanghai (CN)

(*) Notice: Subject to any disclaimer, the term of this patent is extended or adjusted under 35 U.S.C. 154(b) by 228 days.

(21) Appl. No.: 18/353,043

(22) Filed: Jul. 14, 2023

(65) Prior Publication Data

US 2023/0359771 A1    Nov. 9, 2023

Related U.S. Application Data

(63) Continuation of application No. PCT/CN2022/072066, filed on Jan. 14, 2022.

(30) Foreign Application Priority Data

Jan. 14, 2021    (CN) .......................... 202110048683.8

(51) Int. Cl.
*G06F 21/62*    (2013.01)
*G16H 30/20*    (2018.01)

(52) U.S. Cl.
CPC ...... *G06F 21/6254* (2013.01); *G06F 21/6227* (2013.01); *G16H 30/20* (2018.01)

(58) Field of Classification Search
CPC .......................... G06F 21/6254; G06F 21/6227
USPC ............................................................ 726/27
See application file for complete search history.

(56) References Cited

U.S. PATENT DOCUMENTS

| | | | |
|---|---|---|---|
| 2006/0064328 A1 | 3/2006 | Datta et al. | |
| 2010/0063930 A1* | 3/2010 | Kenedy | G06Q 20/3674 705/51 |
| 2010/0082371 A1* | 4/2010 | Kamp | G16H 10/60 705/2 |

(Continued)

FOREIGN PATENT DOCUMENTS

| | | |
|---|---|---|
| CN | 103093074 A | 5/2013 |
| CN | 206100294 U | 4/2017 |

(Continued)

OTHER PUBLICATIONS

Extended European Search Report in European Application No. 22739130.7 mailed on Apr. 19, 2024, 8 pages.

(Continued)

*Primary Examiner* — Samson B Lemma
(74) *Attorney, Agent, or Firm* — Poseidon Advanced IP LLC

(57) ABSTRACT

The present disclosure is related to systems and methods for data masking. The method includes obtaining at least one original file and a hierarchical relationship that is associated with data in the at least one original file. The method includes obtaining a masking template for the data in the at least one original file. The method includes masking the data in the at least one original file based on the masking template, to generate at least one target file. The method includes storing the at least one target file based on the hierarchical relationship.

20 Claims, 10 Drawing Sheets

(56) References Cited

U.S. PATENT DOCUMENTS

| | | | | |
|---|---|---|---|---|
| 2011/0161450 | A1* | 6/2011 | Westin | G06F 16/116 |
| | | | | 709/206 |
| 2015/0379198 | A1* | 12/2015 | Tambasco, Jr. | G16H 10/60 |
| | | | | 705/3 |
| 2016/0292176 | A1* | 10/2016 | Resnick | G06F 16/1847 |
| 2018/0082020 | A1* | 3/2018 | Rajagopal | G06F 21/6254 |
| 2021/0200686 | A1* | 7/2021 | Gabor | G06F 9/3004 |

FOREIGN PATENT DOCUMENTS

| | | |
|---|---|---|
| CN | 109243584 A | 1/2019 |
| CN | 110399733 A | 11/2019 |
| CN | 110502924 A | 11/2019 |
| CN | 110782973 A | 2/2020 |
| CN | 111105856 A | 5/2020 |
| CN | 111125767 A | 5/2020 |
| CN | 111291410 A | 6/2020 |
| CN | 107239666 B | 10/2020 |
| WO | 2022152255 A1 | 7/2022 |

OTHER PUBLICATIONS

International Search Report in PCT/CN2022/072066 mailed on Apr. 14, 2022, 5 pages.
Written Opinion in PCT/CN2022/072066 mailed on Apr. 14, 2022, 4 pages.
First Office Action in Chinese Application No. 202110048683.8 mailed on Mar. 3, 2022, 23 pages.
Wang, Yang et al., Research and Implementation of Desensitization System for CT Medical Images Based on DICOM, Modern Computer, 11: 72-75, 2019.

\* cited by examiner

600

| Tag | VR | Value Length | Value |
|---|---|---|---|
| (0010,0010) Patient's Name | PN | 4 | Chao |
| (0010,0020) Patient ID | LO | 8 | 00066170 |
| (0010,0030) Patient's Birth Date | DA | 8 | 19800620 |
| ⋮ | ⋮ | ⋮ | ⋮ |
| (0008,0020) Study Date | DA | 8 | 20211215 |
| (0008,0021) Series Date | DA | 8 | 20211215 |
| (0008,0030) Study Time | TM | 6 | 074708 |
| (0008,0031) Series Time | TM | 6 | 074708 |
| (0008,0060) Modality | CS | 2 | CT |
| ⋮ | ⋮ | ⋮ | ⋮ |
| (0018,0015) Body Part Examined | CS | 4 | HEAD |

620 — Tag
630 — VR
640 — Value Length
650 — Value
610

SYSTEMS AND METHODS FOR DATA MASKING

CROSS-REFERENCE TO RELATED APPLICATIONS

This application is a Continuation of International Application No. PCT/CN2022/072066, filed on Jan. 14, 2022, which claims priority of Chinese Patent Application No. 202110048683.8, filed on Jan. 14, 2021, and the contents of which are hereby incorporated by reference.

TECHNICAL FIELD

This disclosure generally relates to systems and methods for medical information security, and more particularly, relates to systems and methods for data masking in a medical system.

BACKGROUND

With the development of digitization in the medical field, medical image data is usually communicated and managed via a digital imaging and communications in medicine (DICOM) standard format. Usually, the medical image data (e.g., a DICOM file) includes various types of sensitive and private information of a patient (e.g., a patient name, a patient ID, an address). The medical image data is widely demanded in many fields such as medical teaching, medical communication, and artificial intelligence medical research. The safe dissemination of medical image data relies on the accurate and reasonable masking of the sensitive and private information in the medical image data. Therefore, it is desirable to provide effective systems or methods for data masking in a medical system.

SUMMARY

According to an aspect of the present disclosure, a method may be implemented on a computing device having one or more processors and one or more storage devices. The method may include obtaining at least one original file and a hierarchical relationship that is associated with data in the at least one original file. The method may include obtaining a masking template for the data in the at least one original file. The method may include masking the data in the at least one original file based on the masking template, to generate at least one target file. The method may include storing the at least one target file based on the hierarchical relationship.

In some embodiments, the method may include obtaining a file search query from a user. The method may include obtaining the at least one original file based on the file search query.

In some embodiments, the method may include obtaining at least one masking mode for the data in the at least one original file. The method may include obtaining at least one masking value corresponding to the at least one masking mode. The method may include obtaining the masking template based on the at least one masking mode and the at least one masking value.

In some embodiments, the data in the at least one original file may include a plurality of tags configured to describe identification information related to the at least one original file. The masking template may include the at least one masking mode for at least one tag of the plurality of tags of the at least one original file. The method may include, for each tag of the at least one tag of the plurality of tags, modifying at least part of a value of the tag based on a masking value corresponding to a corresponding masking mode for the tag. The method may include generating the at least one target file based on at least one modified value of the at least one tag of the plurality of tags.

In some embodiments, the method may include obtaining a tag-based hierarchical relationship of the plurality of tags of the at least one original file.

In some embodiments, the method may include verifying the at least one masking value in the masking template.

In some embodiments, the method may include, for each masking value of the at least one masking value in the masking template, obtaining a data type of a value of a tag. The method may include determining whether the masking value satisfies the data type of the tag. The method may include, in response to determining that the masking value satisfies the data type of the tag, determining that the masking value as a verified masking value.

In some embodiments, the method may include obtaining at least one processed target file by performing a format conversion operation on the at least one target file. The method may include exporting the at least one processed target file.

In some embodiments, the method may include storing the at least one target file in a shared storage space.

In some embodiments, the at least one original file may include a digital imaging and communications in medicine (DICOM) file.

In some embodiments, the masking template may include a plurality of masking modes for the data in the at least one original file. At least two masking modes of the plurality of masking modes may be different.

According to another aspect of the present disclosure, a system may include at least one storage device storing a set of instructions, and at least one processor in communication with the at least one storage device. When executing the stored set of instructions, the at least one processor may cause the system to perform a method. The method may include obtaining at least one original file and a hierarchical relationship that is associated with data in the at least one original file. The method may include obtaining a masking template for the data in the at least one original file. The method may include masking the data in the at least one original file based on the masking template, to generate at least one target file. The method may include storing the at least one target file based on the hierarchical relationship.

According to another aspect of the present disclosure, a non-transitory computer readable medium may include at least one set of instructions. When executed by at least one processor of a computing device, the at least one set of instructions may cause the at least one processor to effectuate a method. The method may include obtaining at least one original file and a hierarchical relationship that is associated with data in the at least one original file. The method may include obtaining a masking template for the data in the at least one original file. The method may include masking the data in the at least one original file based on the masking template, to generate at least one target file. The method may include storing the at least one target file based on the hierarchical relationship.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. The drawings are not to scale. These embodiments are non-limiting exemplary embodiments, in which like reference numerals represent similar structures throughout the several views of the drawings, and wherein:

FIG. 6 is a schematic diagram illustrating an exemplary original file according to some embodiments of the present disclosure;

FIG. 8 is a schematic diagram illustrating an exemplary query interface according to some embodiments of the present disclosure;

DETAILED DESCRIPTION

Figure 1:
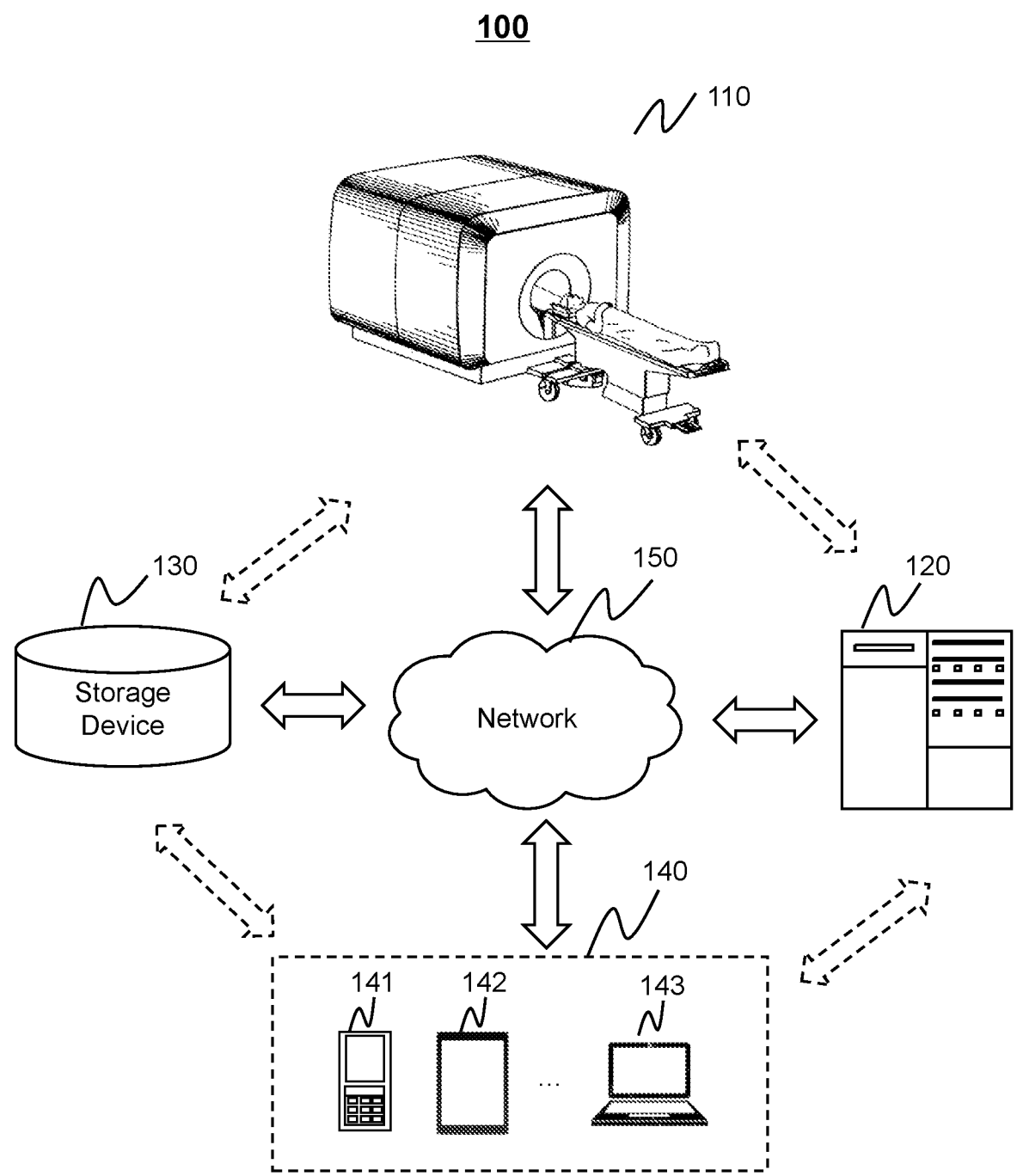
FIG. 1 is a schematic diagram illustrating an exemplary medical system according to some embodiments of the present disclosure.

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. Also, the term "exemplary" is intended to refer to an example or illustration.

It will be understood that the terms "system," "engine," "unit," "module," and/or "block" used herein are one method to distinguish different components, elements, parts, sections or assembly of different levels in ascending order. However, the terms may be displaced by another expression if they achieve the same purpose.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or another storage device. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware, such as an EPROM. It will be further appreciated that hardware modules/units/blocks may be included in connected logic components, such as gates and flip-flops, and/or can be included of programmable units, such as programmable gate arrays or processors. The modules/units/blocks or computing device functionality described herein may be implemented as software modules/units/blocks, but may be represented in hardware or firmware. In general, the modules/units/blocks described herein refer to logical modules/units/blocks that may be combined with other modules/units/blocks or divided into sub-modules/sub-units/sub-blocks despite their physical organization or storage. The description may be applicable to a system, an engine, or a portion thereof.

It will be understood that, although the terms "first," "second," "third," etc., may be used herein to describe various elements, these elements should not be limited by these terms. These terms are only used to distinguish one element from another. For example, a first element could be termed a second element, and, similarly, a second element could be termed a first element, without departing from the scope of exemplary embodiments of the present disclosure.

Spatial and functional relationships between elements are described using various terms, including "connected," "attached," and "mounted." Unless explicitly described as being "direct," when a relationship between first and second elements is described in the present disclosure, that relationship includes a direct relationship where no other intervening elements are present between the first and second elements, and also an indirect relationship where one or more intervening elements are present (either spatially or functionally) between the first and second elements. In contrast, when an element is referred to as being "directly" connected, attached, or positioned to another element, there are no intervening elements present. Other words used to describe the relationship between elements should be interpreted in a like fashion (e.g., "between," versus "directly between," "adjacent," versus "directly adjacent," etc.).

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

An aspect of the present disclosure relates to a system and method for data masking. As used herein, data masking (also referred to as data anonymization or data pseudonymization) refers to a process of replacing sensitive identification data using fictitious identification data such as characters or other data. The purpose of data masking may be to protect sensitive and private information in situations where an enterprise shares data with third parties. According to some embodiments of the present disclosure, a processing device may obtain at least one original file (e.g., a DICOM file) and a hierarchical relationship that is associated with data in the at least one original file. The processing device may obtain a masking template for the data in the at least one original file. The processing device may mask the data in the at least one original file based on the masking template, to generate at least one target file. The processing device may store the at least one target file based on the hierarchical relationship. For example, the processing device may store the at least one target file in a shared storage space. In some embodiments, the processing device may obtain at least one processed target file by performing a format conversion operation on the at least one target file. The processing device may export the at least one processed target file.

Accordingly, the masking template including one or more masking modes for one or more tags of the at least one original file may be flexibly set according to a user preference and/or a masking demand, and the one or more tags in the at least one original file may be masked (e.g., modified) based on the masking template, which may improve the efficiency and flexibility of data masking. In addition, the at least one target file may be stored based on the hierarchical relationship associated with the data of the at least one original file, which may facilitate a user (e.g., a doctor) to retrieve the target file. The hierarchical relationship associated with data of the at least one target file may be unambiguous, thereby avoiding confusion of the data in the at least one target file. Furthermore, the target file of a DICOM format may be converted to a processed target file of another formats (e.g., a bitmap (BMP) format, a joint photographic experts group (JPG) format, a portable network graphics (PNG) format, a tag image file format (TIFF) format), which may facilitate the user to use and/or process the target file. Moreover, the target file and/or the processed target file may be exported to a storage device (e.g., a local disk, a mobile hard disk, a network shared disk) and/or a document (e.g., a Microsoft Office PowerPoint (PPT) document, a Microsoft Office Word document), which may facilitate usage including, e.g., clinical teaching, academic exchange and presentation, and/or image editing. For example, the target file and/or the processed target file may be stored in a shared storage space, which may realize resource sharing, without compromising sensitive information, e.g., identification information, of the subjects represented in the shared images.

FIG. 1 is a schematic diagram illustrating an exemplary medical system according to some embodiments of the present disclosure. As illustrated, a medical system 100 may include a medical device 110, a processing device 120, a storage device 130, a terminal 140, and a network 150. The components of the medical system 100 may be connected in one or more of various ways. Merely by way of example, as illustrated in FIG. 1, the medical device 110 may be connected to the processing device 120 directly as indicated by the bi-directional arrow in dotted lines linking the medical device 110 and the processing device 120, or through the network 150. As another example, the storage device 130 may be connected to the medical device 110 directly as indicated by the bi-directional arrow in dotted lines linking the medical device 110 and the storage device 130, or through the network 150. As still another example, the terminal 140 may be connected to the processing device 120 directly as indicated by the bi-directional arrow in dotted lines linking the terminal 140 and the processing device 120, or through the network 150.

The medical device 110 may be configured to acquire imaging data relating to a subject. The imaging data relating to a subject may include an image (e.g., an image slice), projection data, or a combination thereof. In some embodiments, the imaging data may be a two-dimensional (2D) imaging data, a three-dimensional (3D) imaging data, a four-dimensional (4D) imaging data, or the like, or any combination thereof. In some embodiments, the imaging data may be communicated and managed via a DICOM standard format.

The subject may be biological or non-biological. For example, the subject may include a patient, a man-made object, etc. As another example, the subject may include a specific portion, an organ, and/or tissue of the patient. Specifically, the subject may include the head, the neck, the thorax, the heart, the stomach, a blood vessel, soft tissue, a tumor, or the like, or any combination thereof. In the present disclosure, "object" and "subject" are used interchangeably.

In some embodiments, the medical device 110 may include a single modality imaging device. For example, the medical device 110 may include a positron emission tomography (PET) device, a single-photon emission computed tomography (SPECT) device, a magnetic resonance imaging (MRI) device (also referred to as an MR device, an MR scanner), a computed tomography (CT) device, an ultrasound (US) device, an X-ray imaging device, or the like, or any combination thereof. In some embodiments, the medical device 110 may include a multi-modality imaging device. Exemplary multi-modality imaging devices may include a PET-CT device, a PET-MRI device, a SPET-CT device, or the like, or any combination thereof. The multi-modality imaging device may perform multi-modality imaging simultaneously. For example, the PET-CT device may generate structural X-ray CT data and functional PET data simultaneously in a single scan. The PET-MRI device may generate MRI data and PET data simultaneously in a single scan.

The processing device 120 may process data and/or information obtained from the medical device 110, the storage device 130, and/or the terminal(s) 140. For example, the processing device 120 may obtain at least one original file and a hierarchical relationship that is associated with data in the at least one original file. As another example, the processing device 120 may obtain a masking template for data in at least one original file. As another example, the processing device 120 may mask data in at least one original file based on the masking template, to generate at least one target file. As another example, the processing device 120 may store at least one target file based on a hierarchical relationship associated with data in at least one original file. In some embodiments, the processing device 120 may be a single server or a server group. The server group may be centralized or distributed. In some embodiments, the processing device 120 may be local or remote. For example, the processing device 120 may access information and/or data from the medical device 110, the storage device 130, and/or the terminal(s) 140 via the network 150. As another example, the processing device 120 may be directly connected to the medical device 110, the terminal(s) 140, and/or the storage device 130 to access information and/or data. In some embodiments, the processing device 120 may be implemented on a cloud platform. For example, the cloud platform may include a private cloud, a public cloud, a hybrid cloud, a community cloud, a distributed cloud, an inter-cloud, a multi-cloud, or the like, or a combination thereof. In some embodiments, the processing device 120 may be part of the terminal 140. In some embodiments, the processing device 120 may be part of the medical device 110.

The storage device 130 may store data, instructions, and/or any other information. In some embodiments, the storage device 130 may store data obtained from the medical device 110, the processing device 120, and/or the terminal(s) 140. The data may include image data acquired by the processing device 120, algorithms and/or models for processing the image data, etc. For example, the storage device 130 may store at least one original file and a hierarchical relationship that is associated with data in the at least one original file. As another example, the storage device 130 may store a masking template for data in at least one original file. As another example, the storage device 130 may store at least one target file generated by the processing device 120. In some embodiments, the storage device 130 may store data and/or instructions that the processing device 120 and/or the terminal 140 may execute or use to perform exemplary methods described in the present disclosure. In some embodiments, the storage device 130 may include a mass storage, removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memories may include a random-access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), a high-speed RAM, etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage device 130 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 130 may be connected to the network 150 to communicate with one or more other components in the medical system 100 (e.g., the processing device 120, the terminal(s) 140). One or more components in the medical system 100 may access the data or instructions stored in the storage device 130 via the network 150. In some embodiments, the storage device 130 may be integrated into the medical device 110.

The terminal(s) 140 may be connected to and/or communicate with the medical device 110, the processing device 120, and/or the storage device 130. In some embodiments, the terminal 140 may include a mobile device 141, a tablet computer 142, a laptop computer 143, or the like, or any combination thereof. For example, the mobile device 141 may include a mobile phone, a personal digital assistant (PDA), a gaming device, a navigation device, a point of sale (POS) device, a laptop, a tablet computer, a desktop, or the like, or any combination thereof. In some embodiments, the terminal 140 may include an input device, an output device, etc. The input device may include alphanumeric and other keys that may be input via a keyboard, a touchscreen (for example, with haptics or tactile feedback), a speech input, an eye tracking input, a brain monitoring system, or any other comparable input mechanism. Other types of the input device may include a cursor control device, such as a mouse, a trackball, or cursor direction keys, etc. The output device may include a display, a printer, or the like, or any combination thereof.

The network 150 may include any suitable network that can facilitate the exchange of information and/or data for the medical system 100. In some embodiments, one or more components of the medical system 100 (e.g., the medical device 110, the processing device 120, the storage device 130, the terminal(s) 140, etc.) may communicate information and/or data with one or more other components of the medical system 100 via the network 150. For example, the processing device 120 and/or the terminal 140 may obtain at least one original file (e.g., a DICOM file) from the medical device 110 via the network 150. As another example, the processing device 120 and/or the terminal 140 may obtain information stored in the storage device 130 via the network 150. The network 150 may be and/or include a public network (e.g., the Internet), a private network (e.g., a local area network (LAN), a wide area network (WAN)), etc.), a wired network (e.g., an Ethernet network), a wireless network (e.g., an 802.11 network, a Wi-Fi network, etc.), a cellular network (e.g., a Long Term Evolution (LTE) network), a frame relay network, a virtual private network (VPN), a satellite network, a telephone network, routers, hubs, witches, server computers, and/or any combination thereof. For example, the network 150 may include a cable network, a wireline network, a fiber-optic network, a telecommunications network, an intranet, a wireless local area network (WLAN), a metropolitan area network (MAN), a public telephone switched network (PSTN), a Bluetooth™ network, a ZigBee™ network, a near field communication (NFC) network, or the like, or any combination thereof. In some embodiments, the network 150 may include one or more network access points. For example, the network 150 may include wired and/or wireless network access points such as base stations and/or internet exchange points through which one or more components of the medical system 100 may be connected to the network 150 to exchange data and/or information.

This description is intended to be illustrative, and not to limit the scope of the present disclosure. Many alternatives, modifications, and variations will be apparent to those skilled in the art. The features, structures, methods, and other characteristics of the exemplary embodiments described herein may be combined in various ways to obtain additional and/or alternative exemplary embodiments. However, those variations and modifications do not depart the scope of the present disclosure. In some embodiments, the medical system 100 may include a picture archiving and communication systems (PACS). In some embodiments, the processing device 120 may be part of the PACS. For example, the PACS may store one or more original files (e.g., one or more DICOM files) acquired by a medical device (e.g., the medical device 110). In some embodiments, the PACS may obtain the one or more original files from the medical device (e.g., the medical device 110) directly. In some embodiments, the medical device (e.g., the medical device 110) may transmit the one or more original files to a storage device (e.g., a local disk, a network disk) of the medical system 100. The PACS may obtain the one or more original files from the storage device. The PACS may obtain a hierarchical relationship associated with data in the one or more original files. The PACS may obtain a masking template for the data in the one or more original files. The PACS may mask the data in the one or more original files based on the masking template, to generate one or more target files. The PACS may store the one or more target files based on the hierarchical relationship associated with the data in the one or more original files.

Figure 2:
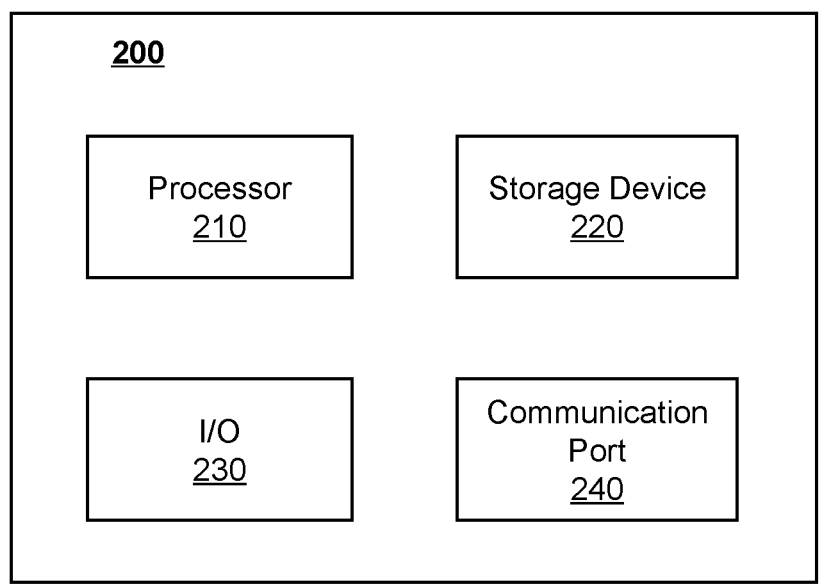
FIG. 2 is a schematic diagram illustrating exemplary hardware and/or software components of an exemplary computing device on which the processing device 120 may be implemented according to some embodiments of the present disclosure.

FIG. 2 is a schematic diagram illustrating exemplary hardware and/or software components of an exemplary computing device on which the processing device 120 may be implemented according to some embodiments of the present disclosure. As illustrated in FIG. 2, a computing device 200 may include a processor 210, a storage device 220, an input/output (I/O) 230, and a communication port 240.

The processor 210 may execute computer instructions (e.g., program code) and perform functions of the processing device 120 in accordance with techniques described herein. The computer instructions may include, for example, routines, programs, objects, components, data structures, procedures, modules, and functions, which perform particular functions described herein. For example, the processor 210 may process image data obtained from the medical device 110, the terminal 140, the storage device 130, and/or any other component of the medical system 100. In some embodiments, the processor 210 may include one or more hardware processors, such as a microcontroller, a microprocessor, a reduced instruction set computer (RISC), an application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), any circuit or processor capable of executing one or more functions, or the like, or any combination thereof.

Merely for illustration, only one processor is described in the computing device 200. However, it should be noted that the computing device 200 in the present disclosure may also include multiple processors. Thus operations and/or method steps that are performed by one processor as described in the present disclosure may also be jointly or separately performed by the multiple processors. For example, if in the present disclosure the processor of the computing device 200 executes both process A and process B, it should be understood that process A and process B may also be performed by two or more different processors jointly or separately in the computing device 200 (e.g., a first processor executes process A and a second processor executes process B, or the first and second processors jointly execute processes A and B).

The storage device 220 may store data/information obtained from the medical device 110, the terminal 140, the storage device 130, and/or any other component of the medical system 100. The storage device 220 may be similar to the storage device 130 described in connection with FIG. 1, and the detailed descriptions are not repeated here.

The I/O 230 may input and/or output signals, data, information, etc. In some embodiments, the I/O 230 may enable a user interaction with the processing device 120. In some embodiments, the I/O 230 may include an input device and an output device. Examples of the input device may include a keyboard, a mouse, a touchscreen, a microphone, a sound recording device, or the like, or a combination thereof. Examples of the output device may include a display device, a loudspeaker, a printer, a projector, or the like, or a combination thereof. Examples of the display device may include a liquid crystal display (LCD), a light-emitting diode (LED)-based display, a flat panel display, a curved screen, a television device, a cathode ray tube (CRT), a touchscreen, or the like, or a combination thereof.

The communication port 240 may be connected to a network (e.g., the network 150) to facilitate data communications. The communication port 240 may establish connections between the processing device 120 and the medical device 110, the terminal 140, and/or the storage device 130. The connection may be a wired connection, a wireless connection, any other communication connection that can enable data transmission and/or reception, and/or any combination of these connections. The wired connection may include, for example, an electrical cable, an optical cable, a telephone wire, or the like, or any combination thereof. The wireless connection may include, for example, a Bluetooth™ link, a Wi-Fi™ link, a WiMax™ link, a WLAN link, a ZigBee link, a mobile network link (e.g., 3G, 4G, 5G), or the like, or any combination thereof. In some embodiments, the communication port 240 may be and/or include a standardized communication port, such as RS232, RS485. In some embodiments, the communication port 240 may be a specially designed communication port. For example, the communication port 240 may be designed in accordance with the digital imaging and communications in medicine (DICOM) protocol.

Figure 3:
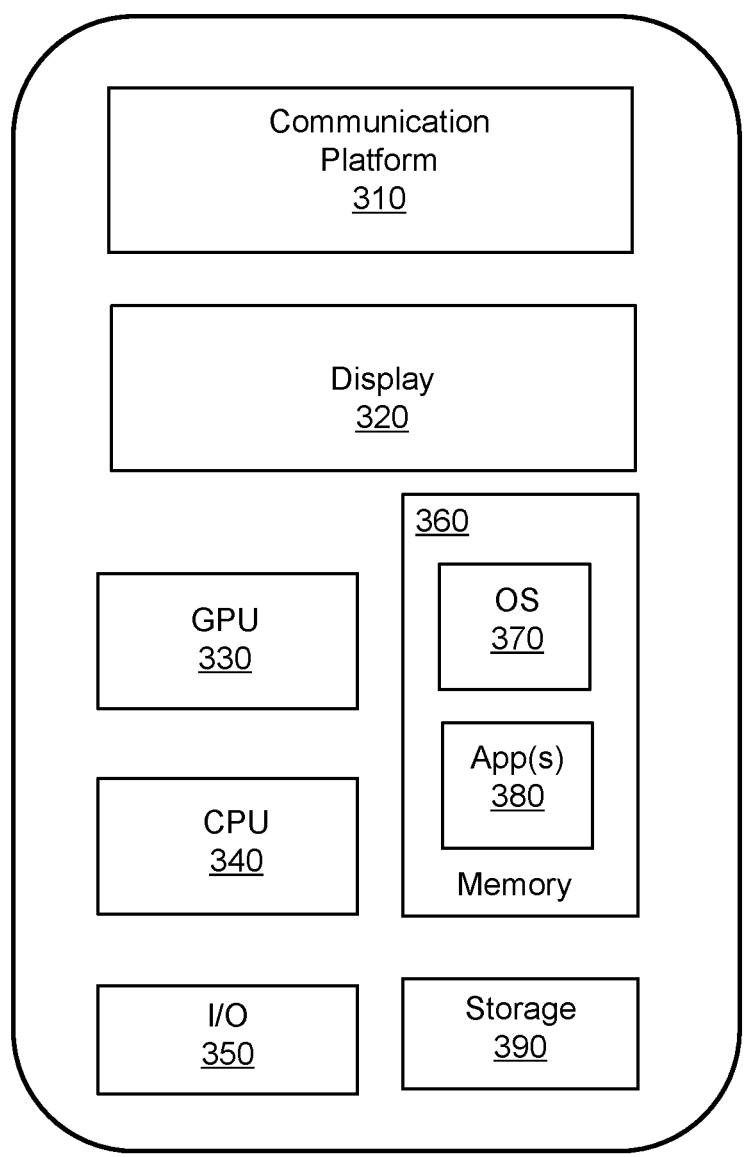
FIG. 3 is a schematic diagram illustrating exemplary hardware and/or software components of an exemplary mobile device according to some embodiments of the present disclosure.

FIG. 3 is a schematic diagram illustrating exemplary hardware and/or software components of an exemplary mobile device according to some embodiments of the present disclosure. In some embodiments, the terminal 140 and/or the processing device 120 may be implemented on a mobile device 300, respectively.

As illustrated in FIG. 3, the mobile device 300 may include a communication platform 310, a display 320, a graphics processing unit (GPU) 330, a central processing unit (CPU) 340, an I/O 350, a memory 360, and storage 390.

In some embodiments, any other suitable component, including but not limited to a system bus or a controller (not shown), may also be included in the mobile device 300.

In some embodiments, the communication platform 310 may be configured to establish a connection between the mobile device 300 and other components of the medical system 100, and enable data and/or signal to be transmitted between the mobile device 300 and other components of the medical system 100. For example, the communication platform 310 may establish a wireless connection between the mobile device 300 and the medical device 110, and/or the processing device 120. The wireless connection may include, for example, a Bluetooth™ link, a Wi-Fi™ link, a WiMax™ link, a WLAN link, a ZigBee link, a mobile network link (e.g., 3G, 4G, 5G), or the like, or any combination thereof. The communication platform 310 may also enable the data and/or signal between the mobile device 300 and other components of the medical system 100. For example, the communication platform 310 may transmit data and/or signals inputted by a user to other components of the medical system 100. The inputted data and/or signals may include a user instruction. As another example, the communication platform 310 may receive data and/or signals transmitted from the processing device 120. The received data and/or signals may include imaging data acquired by the medical device 110.

In some embodiments, a mobile operating system (OS) 370 (e.g., iOS™ Android™, Windows Phone™, etc.) and one or more applications (App(s)) 380 may be loaded into the memory 360 from the storage 390 in order to be executed by the CPU 340. The applications 380 may include a browser or any other suitable mobile apps for receiving and rendering information from the processing device 120. User interactions with the information stream may be achieved via the I/O 350 and provided to the processing device 120 and/or other components of the medical system 100 via the network 150.

To implement various modules, units, and their functionalities described in the present disclosure, computer hardware platforms may be used as the hardware platform(s) for one or more of the elements described herein. A computer with user interface elements may be used to implement a personal computer (PC) or another type of work station or terminal device, although a computer may also act as a server if appropriately programmed. It is believed that those skilled in the art are familiar with the structure, programming and general operation of such computer equipment and as a result the drawings should be self-explanatory.

Figure 4:
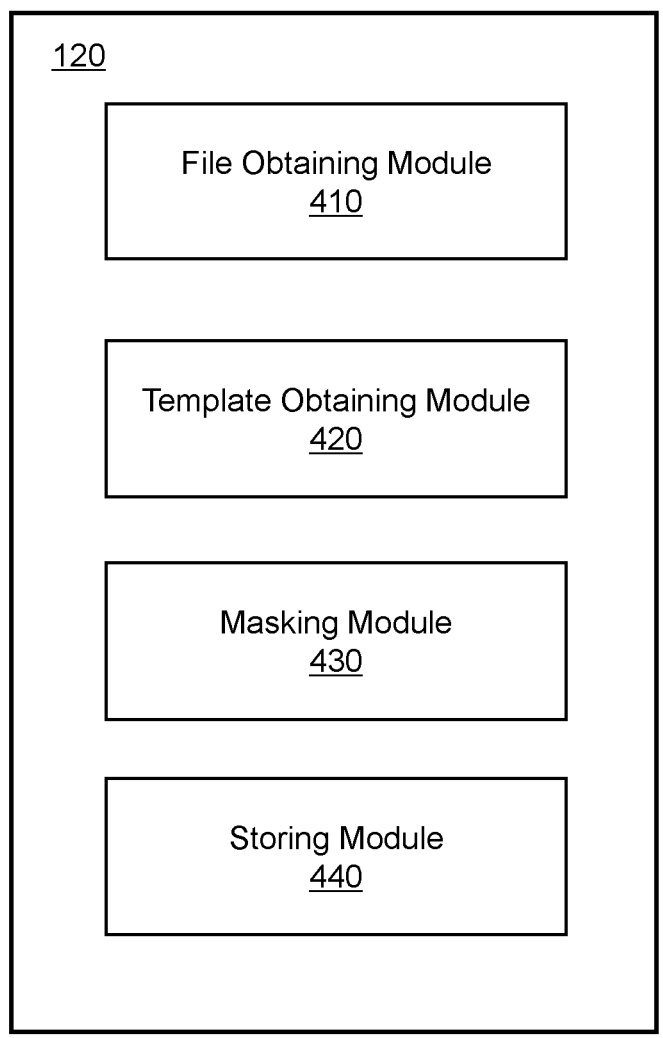
FIG. 4 is a schematic diagram illustrating an exemplary processing device according to some embodiments of the present disclosure.

FIG. 4 is a schematic diagram illustrating an exemplary processing device according to some embodiments of the present disclosure. In some embodiments, the processing device 120 may include a file obtaining module 410, a template obtaining module 420, a masking module 430, and a storing module 440.

The file obtaining module 410 may be configured to obtain at least one original file and a hierarchical relationship associated with data in the at least one original file. In some embodiments, the file obtaining module 410 may obtain a file search query from a user. The file obtaining module 410 may obtain at least one original file based on the file search query. In some embodiments, the file obtaining module 410 may obtain a hierarchical relationship associated with data in at least one original file based on at least one tag in the at least one original file. More descriptions for obtaining the at least one original file and the hierarchical relationship associated with the data in the at least one original file may be found elsewhere in the present disclosure (e.g., operation 510 in FIG. 5 and descriptions thereof).

The template obtaining module 420 may be configured to obtain a masking template for data in at least one original file. In some embodiments, the template obtaining module 420 may obtain at least one masking mode for data in at least one original file. The template obtaining module 420 may obtain at least one masking value corresponding to the at least one masking mode. The template obtaining module 420 may obtain the masking template based on the at least one masking mode and the at least one masking value. More descriptions for obtaining a masking template may be found elsewhere in the present disclosure (e.g., operation 520 in FIG. 5 and descriptions thereof).

The masking module 430 may be configured to mask data in at least one original file based on a masking template, to generate at least one target file. In some embodiments, for each tag of a plurality of tags in at least one original file, the masking module 430 may mask (e.g., modify) at least part of a value of the tag based on a masking value corresponding to a corresponding masking mode for the tag in the masking template. In some embodiments, the value of the tag may include a plurality of characters (e.g., a mark, a sign, a symbol, a letter, a Chinese character). The masking module 430 may mask (e.g., modify) one or more characters of the plurality of characters of the value of the tag based on the masking value corresponding to the masking mode for the tag. For example, the masking module 430 may replace one or more characters of the plurality of characters of the value of the tag with the masking value corresponding to the masking mode for the tag. The masking module 430 may generate at least one target file based on at least one masked value (e.g., modified value) of the at least one tag of the plurality of tags. More descriptions for generating the at least one target file may be found elsewhere in the present disclosure (e.g., operation 530 in FIG. 5 and descriptions thereof).

The storing module 440 may be configured to store at least one target file. In some embodiments, the storing module 440 may store at least one target file based on a hierarchical relationship associated with data in at least one original file. In some embodiments, a hierarchical relationship associated with data in at least one target file may be the same as a hierarchical relationship associated with data in at least one original file. More descriptions for storing the at least one target file may be found elsewhere in the present disclosure (e.g., operation 540 in FIG. 5 and descriptions thereof).

It should be noted that the above description of the processing device 120 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more modules may be combined into a single module. For example, the file obtaining module 410 and the template obtaining module 420 may be combined into a single module. In some embodiments, one or more modules may be added or omitted in the processing device 120. For example, the processing device 120 may further include a storage module (not shown in FIG. 4) configured to store data and/or information (e.g., at least one original file, a hierarchical relationship associated with data in at least one original file, a masking template, at least one target file) associated with the medical system 100. As another example, the processing device 120 may further include a verifying module (not shown in FIG. 4) configured to verify at least one masking value in a masking template.

Figure 5:
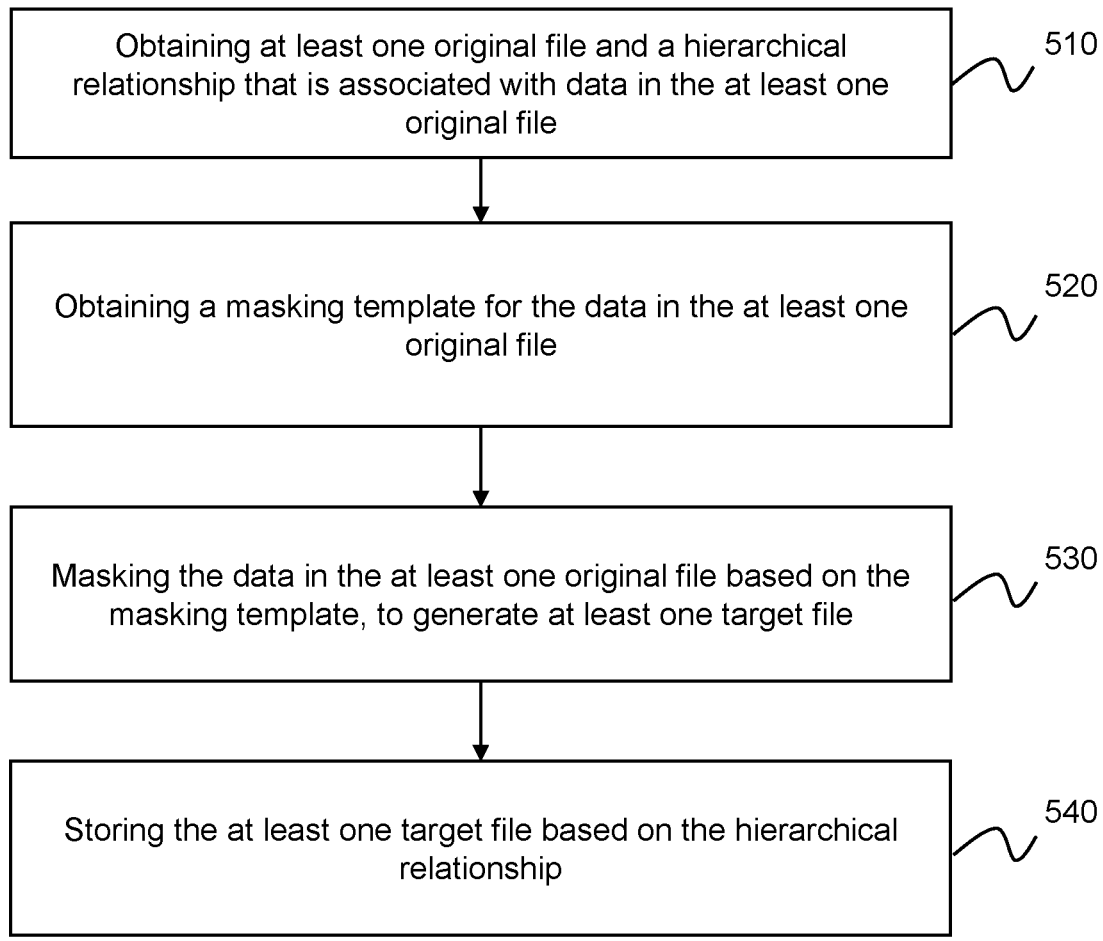
FIG. 5 is a flowchart illustrating an exemplary process for storing at least one target file according to some embodiments of the present disclosure.

FIG. 5 is a flowchart illustrating an exemplary process for storing at least one target file according to some embodiments of the present disclosure. In some embodiments, process 500 may be executed by the medical system 100. For example, the process 500 may be implemented as a set of instructions (e.g., an application) stored in a storage device (e.g., the storage device 130, the storage device 220, and/or the storage 390). In some embodiments, the processing device 120 (e.g., the processor 210 of the computing device 200, the CPU 340 of the mobile device 300, and/or one or more modules illustrated in FIG. 4) may execute the set of instructions and may accordingly be directed to perform the process 500. The operations of the illustrated process presented below are intended to be illustrative. In some embodiments, the process 500 may be accomplished with one or more additional operations not described and/or without one or more of the operations discussed. Additionally, the order of the operations of process 500 illustrated in FIG. 5 and described below is not intended to be limiting.

In 510, the processing device 120 (e.g., the file obtaining module 410) may obtain at least one original file and a hierarchical relationship that is associated with data in the at least one original file.

In some embodiments, the medical system 100 may include a picture archiving and communication system (PACS). The PACS may use digital imaging and communications in medicine (DICOM) to store and transmit images. In some embodiments, the PACS may store one or more original files. In some embodiments, the original file may include a DICOM file. The DICOM file may include an image (e.g., a CT image, an MRI image, a PET image) in the DICOM format. As used herein, a DICOM may refer to a standard for image data storage and transfer. The DICOM may use a specific file format and a communication protocol to define a medical image format that can be used for data exchange that meets clinical needs in terms of image quality.

In some embodiments, the original file (e.g., the DICOM file) may be obtained from a medical device (e.g., the medical device 110) directly. In some embodiments, the original file (e.g., the DICOM file) may be obtained by performing a format conversion operation on a file with a non-DICOM format. For example, the non-DICOM format may include an MRI scan format of a specific manufacturer, a grid data format, a neuroimaging informatics technology initiative format, or the like.

In some embodiments, the data in the original file may include a plurality of data elements (e.g., a data element 610 as illustrated in FIG. 6). The plurality of data elements may be configured to describe identification information related to the original file. Each data element may describe one or more types of identification information related to the original file. The identification information related to the original file may include information related to a patient (e.g., an identification (ID) number, a name, the gender, the age, a date of birth, a scan region), information related to an operation (e.g., a scan) of the patient (e.g., a scanning parameter), information related to a medical device that performs the operation on the patient (e.g., a modality of the medical device, a model of the medical device), information related to an image of the patient (e.g., a size, a density resolution, a spatial resolution, a signal-to-noise ratio, an image reconstruction parameter), or the like, or any combination thereof.

In some embodiments, each data element of the plurality of data elements of the original file may include a tag, a data type (also referred to as a value representation (VR)) of the tag, a value length of the tag, a value of the tag, or the like, or any combination thereof. FIG. 6 is a schematic diagram illustrating an exemplary original file according to some embodiments of the present disclosure. As illustrated in FIG. 6, identification information related to an original file 600 (e.g., a DICOM file) may include a plurality of data elements 610. A row of data in the original file 600 may be one data element 610. Each data element 610 may include a tag 620, a VR 630 of the tag 620, a value length 640 of the tag 620, a value 650 of the tag 620.

The tag may describe a type of identification information related to the original file. In some embodiments, the tag may be in a form of a collection of numbers. For example, the tag may include codes consisting of two hexadecimal components (e.g., a group number, an element number). Merely by way of example, as illustrated in FIG. 6, the patient ID may have a tag of (0010, 0020), wherein "0010" is a group number, and "0020" is an element number. The data type may describe the format of the value of the tag. In some embodiments, the data type may be represented as two-character code. For example, the data type may include PN (person name), CS (code string), SH (short string), LO (long string), UI (unique identifier), DA (date), TM (time), or the like, or any combination thereof, as described elsewhere in the present disclosure (e.g., Table 1 and descriptions thereof). The value length may describe a character count of the value of the tag. For example, if a value of a tag of patient ID is "00066170," the value length of the tag of patient ID is eight. In some embodiments, the identification information corresponding to the tag may include sensitive information, privacy information, or the like, of a patient.

In some embodiments, the data (e.g., the plurality of tags, the VRs of the plurality of tags, the value lengths of the plurality of tags, the values of the plurality of tags) in the original file may be organized into multiple levels of hierarchy. In some embodiments, the hierarchical relationship associated with the data in the plurality of original files may represent a relationship between the data in the plurality of original files. The relationship between the data in the plurality of original files may include a relationship between tags of the plurality of original files. In some embodiments, the hierarchical relationship may also be associated with a relationship of the plurality of tags in the original file. The original file may include a medical file, a DICOM file, or the like. In some embodiments, the plurality of tags in the original file may have a tag-based hierarchical relationship. The tag-based hierarchical relationship may be a multiple-level hierarchy. For example, the plurality of tags may have a four-level hierarchy. The four-level hierarchy may include a patient level, a study level, a series level, and an image level. In some embodiments, each level may correspond to an UID. For example, the patient level may correspond to a patient ID. The study level may correspond to a study instance UID. The series level may correspond to a series instance UID. The image level may correspond to a SOP instance UID. In some embodiments, the study instance UID, the series instance UID and the SOP instance UID may be globally unique identifiers. The tags of the patient level may include information related to a patient (e.g., a patient ID, a name, the gender, the age, a date of birth, a scan region). The tags of the study level may include information related to a study (e.g., an imaging procedure) of a patient (e.g., a study instance unique identifier (UID), a study date, a study time). The tags of the series level may include information related to a series of a study of a patient (e.g., a series instance UID, a series date, a series time, a modality of a medical device that acquires scan data used to generated an image in the series). In some embodiments, the series of the patient may be defined by a medical device acquiring image(s) in the series, one or more scanning parameters used by the medical device scanning the patient, an image reconstruction technique for image(s) in the series, or the like, or any combination thereof. Different images of a same subject acquired by different medical devices may correspond to different series. For example, an MR image of a patient obtained by an MRI device may be considered a different series than a PET image of the patient obtained by a PET device. Different images of a same subject generated using different image reconstruction techniques based on same scan data (e.g., projection data) may correspond to different series. For example, an image generated using an image reconstruction technique (e.g., a back-projection technique) based on scan data (e.g., projection data) may be considered a different series than another image generated using another image reconstruction technique (e.g., an iteration reconstruction technique) based on the same scan data (e.g., projection data). Different images generated using a same imaging device but based on different scanning parameters may correspond to different series. For example, an MR image generated based on k-space data acquired by an MRI device according to a spin-echo sequence may be considered a different series than another MR image generated based on k-space data acquired by the same MRI device according to a gradient echo sequence. The tags of the image level may include information related to an image of the patient (e.g., a service-object pair (SOP) instance UID, an image type, an acquisition date, an acquisition time, a size, a density resolution, a spatial resolution, a signal-to-noise ratio, an image reconstruction parameter).

Figure 7:
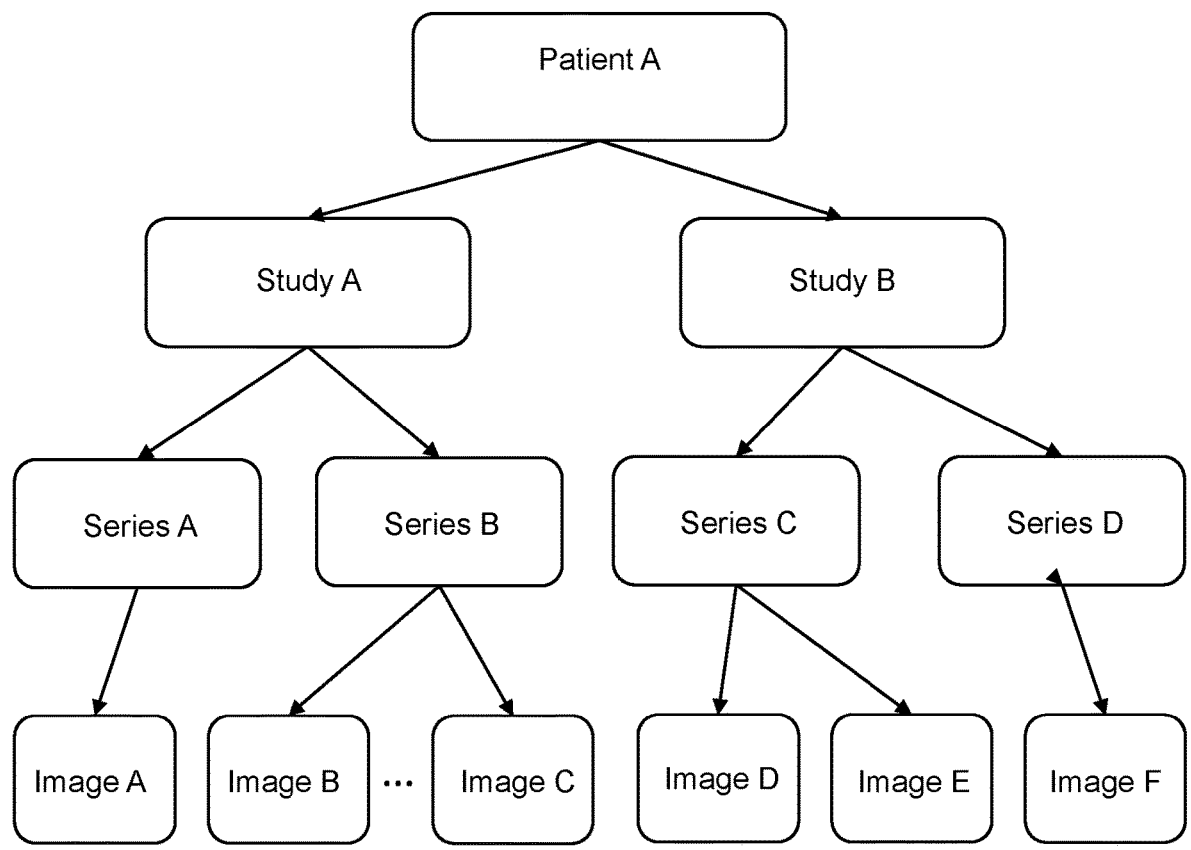
FIG. 7 is a schematic diagram illustrating an exemplary hierarchical relationship associated with data in an original file according to some embodiments of the present disclosure.

In some embodiments, a patient may correspond to one or more studies. Each study may correspond to one or more series. Each series may correspond to one or more images. FIG. 7 is a schematic diagram illustrating an exemplary hierarchical relationship associated with data in an original file according to some embodiments of the present disclosure. As illustrated in FIG. 7, a patient A may correspond to a study A and a study B. For example, two imaging procedures (e.g., the study A and the study B) may be performed on the patient A. The study A may include a series A and a series B. The study B may include a series C and a series D. For example, in the study A (or the study B), a CT scan and an MRI scan may be performed on the patient A. The series A (or the series C) may include data related to the CT scan. The series B (or the series D) may include data related to the MRI scan. The series A may include an image A (e.g., a CT image). The series B may include an image B (e.g., an MRI image) and an image C (e.g., an MRI image). The series C may include an image D (e.g., a CT image) and an image E (e.g., a CT image). The series D may include an image F (e.g., an MRI image). In some embodiments, different images in a same series may correspond to different image quality parameters (e.g., a density resolution, a spatial resolution, a signal-to-noise ratio). In some embodiments, different images in a same series may correspond to different portions of the scan region of the patient A.

In some embodiments, a plurality of original files may be stored in a database (e.g., the PACS) of the medical system 100 based on the hierarchical relationship associated with the data in the plurality of original files. For example, the database may include a plurality of first-level directories. Each first-level directory may correspond to a patient. That is, one or more original files (e.g., DICOM files) associated with a specific patient may be stored in a corresponding first-level directory. Each first-level directory may include one or more second-level directories. Each second-level directory may correspond to a study of a patient. That is, one or more original files (of the plurality of original files) associated with a specific study of the patient may be stored in a corresponding second-level directory of the first-level directory. Each second-level directory may include one or more third-level directories. Each third-level directory may correspond to a series of a study of a patient. That is, one or more original files (of the plurality of original files) associated with a specific series of the study of the patient may be stored in a corresponding third-level directory of the second-level directory of the first-level directory. For example, referring to FIG. 7, a database may include a first-level directory corresponding to the patient A. The first-level directory may include a second-level directory A corresponding to the study A, and a second-level directory B corresponding to the study B. The second-level directory A may include a third-level directory A corresponding to the series A, and a third-level directory B corresponding to the series B. The second-level directory B may include a third-level directory C corresponding to the series C, and a third-level directory D corresponding to the series D. The image A may be stored in the third-level directory A. The image B and the image C may be stored in the third-level directory B. The image D and the image E may be stored in the third-level directory C. The image D may be stored in the third-level directory D.

In some embodiments, the processing device 120 may obtain the at least one original file from a storage device (e.g., the storage device 130) of the medical system 100 or an external database (e.g., a storage device implemented on a cloud platform) via the network 150 directly. In some embodiments, the processing device 120 may obtain a file search query from a user. In some embodiments, the file search query may include a request for a data masking operation. In some embodiments, the file search query may trigger a data masking operation. For example, the file search query may include one or more keywords associated with the information related to a patient, the information related to a study of the patient, the information related to a series of the study of the patient, the information related to an image of the patient, or the like, or any combination thereof. The file search query may be in any form. For example, the file search query may be in the form of text, voice, a picture, or the like, or any combination thereof. Further, the processing device 120 may obtain the at least one original file based on the file search query. For example, the processing device 120 may obtain data to be masked (e.g., one or more tags to be masked) in the at least one original file and/or storage information of the data to be masked in the at least one original file based on the file search query. The storage information of the data to be masked in the at least one original file may include a storage path of the at least one original file, a storage date of the at least one original file, or the like, or any combination thereof. As used herein, a storage path of a file refers to a storage location of the file in a database. As used herein, a storage date of a file refers to a date when the file is stored in a database. The processing device 120 may obtain the at least one original file based on the data to be masked in the at least one original file and/or the storage information of the data to be masked in the at least one original file. Accordingly, the at least one original file may be automatically obtained based on the file search query including one or more keywords, and the user does not need to manually search the at least one original file (e.g., the user manually opens a folder to find the at least one original file), which may save query time and improve query efficiency.

Figure 8:
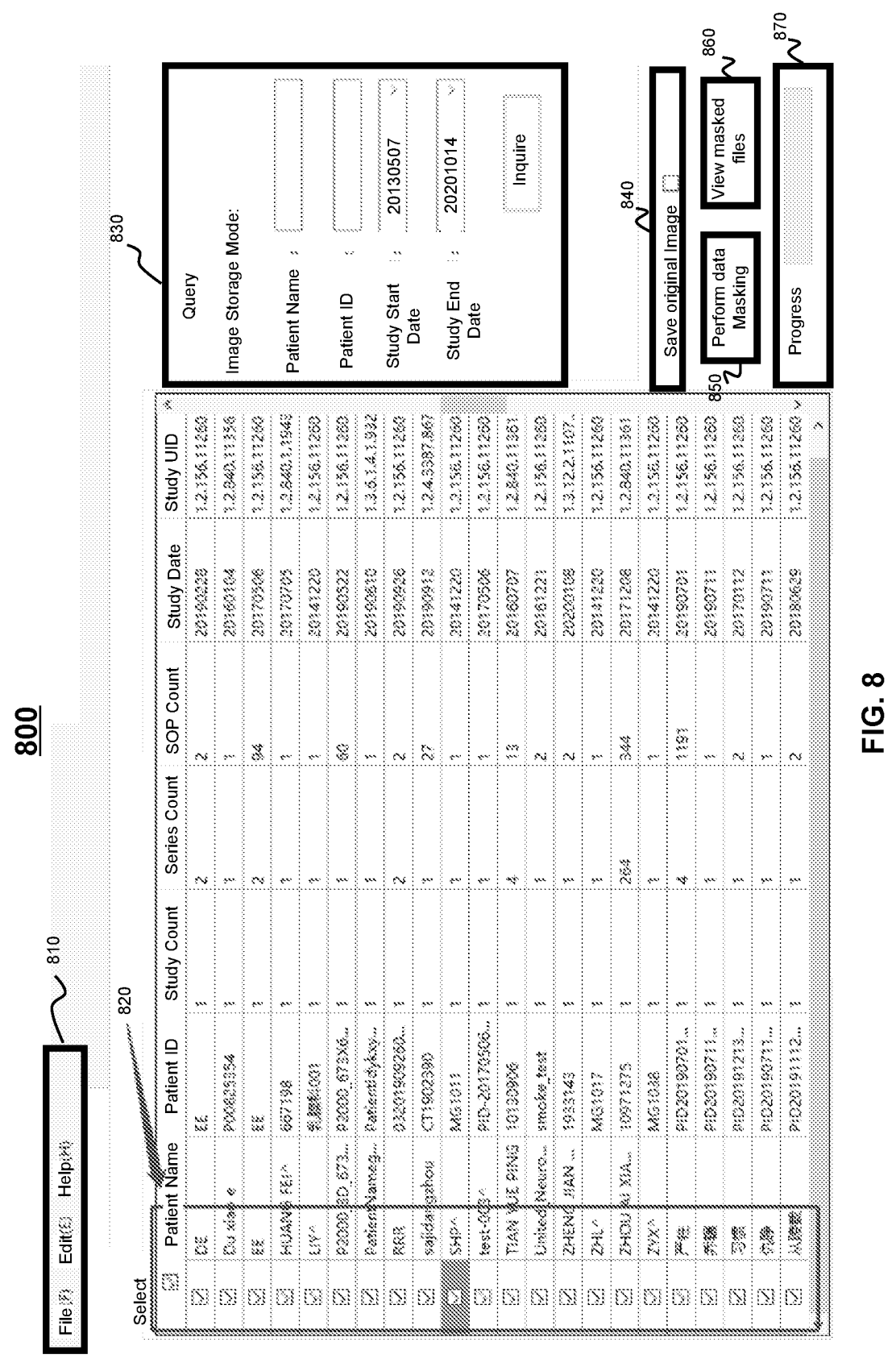

In some embodiments, the user may input the query request via a data masking system (e.g., a PACS image archiving system). For example, a terminal device (e.g., the terminal 140) of the user may display a query interface of the data masking system configured to obtain the file search query from the user. FIG. 8 is a schematic diagram illustrating an exemplary query interface according to some embodiments of the present disclosure. As illustrated in FIG. 8, a query interface 800 may include one or more user interface elements for presenting information associated with a data masking system. The user interface elements may include one or more buttons, icons, checkboxes, message boxes, text fields, data fields, search fields, or the like. For example, the query interface 800 may include a menu bar 810 for presenting operations (e.g., "file," "edit," "help") associated with the data masking system. The query interface 800 may also include a data section 820 for presenting data (e.g., a plurality of original files, a plurality of tags of a plurality of original files) that can be selected by the user to initiate a file search query. The user can initiate a file search query by selecting one or more tags via the data section 820.

The query interface 800 may further include a search box 830 for presenting a file search query inputted by a user. The user can input one or more keywords in the search box 830 to initiate a file search query. In some embodiments, after the user inputs one or more keywords in the search box 830 to initiate a file search query, the data section 820 may present a search result. The search result may include data (e.g., one or more original files, one or more tags of one or more original files) associated with the file search query. The user may modify the presented data (e.g., the one or more original files, the one or more tags of one or more original files) associated with the file search query. For example, the user may add one or more original files in the data section 820 and/or remove one or more original files presented in the data section 820 by clicking one or more boxes corresponding to the one or more original files. The query interface 800 may further include an option section 840 that can be selected by the user to determine whether the original file needs to be saved. The query interface 800 may further include a button 850 that can be selected by the user to perform a data masking operation. The query interface 800 may further include a button 860 that can be selected by the user to view a masked file (i.e., a target file). The query interface 800 may further include a progress bar 870 for presenting a progress of data masking.

For illustration purposes, as illustrated in FIG. 8, if a file search query is that the study start date is 20130507 and the study end date is 20201014, the data section 820 may present a search result. The search result may include data (e.g., a plurality of original files) associated with a plurality of patients whose study dates are between the study start date (i.e., 20130507) and the study end date (i.e., 20201014). The user may add data associated with one or more other patients in the data section 820. The user may also delete the data associated with the one or more patients presented in the data section 820.

In some embodiments, after the user confirms the search result, one or more selected patients in the data section 820 may be marked. The processing device 120 may obtain study instance UIDs of the one or more marked patients. The processing device 120 may obtain SOP instance UIDs of one or more original files corresponding to the study instance UIDs of the one or more marked patients. The processing device 120 may obtain storage paths of the one or more original files based on the SOP instance UIDs of one or more original files. The processing device 120 may obtain data (e.g., one or more tags) in the one or more original files based on the storage paths of the one or more original files. For example, the processing device 120 may downloaded the one or more original files from a cloud environment, and store the one or more original files in a temporary directory or temporary folder on a local storage device. In some embodiments, the user may manually select the at least one original file stored in a local folder. The processing device 120 may further mask the data (e.g., the one or more tags) in the one or more original file based on a masking template as described elsewhere in the present disclosure.

In some embodiments, the processing device 120 may obtain the hierarchical relationship associated with the data in the at least one original file based on the at least one tag in the at least one original file. For example, after a tag of patient name is selected in the data section 820 of the query interface 800, the processing device 120 may obtain a study instance UID of the patient. The processing device 120 may obtain one or more series corresponding to the study instance UID of the patient. The processing device 120 may obtain one or more images corresponding to each series of the one or more series corresponding to the study instance UID of the patient. The processing device 120 may obtain the hierarchical relationship based on the one or more series corresponding to the study instance UID of the patient, and the one or more images corresponding to each series of the one or more series corresponding to the study instance UID of the patient. In some embodiments, the hierarchical relationship associated with the data in the at least one original file may be stored in a storage device (e.g., a memory) of the medical system 100 or an external database in a form of computer codes.

In 520, the processing device 120 (e.g., the template obtaining module 420) may obtain a masking template for the data in the at least one original file. As used in the present disclosure, the masking template is also referred to as a masking rule, a modification rule, a modification reference, or a modification template.

In some embodiments, the processing device 120 may obtain at least one masking mode for the data in the at least one original file. The processing device 120 may obtain at least one masking value corresponding to the at least one masking mode. The masking value corresponding to a masking mode for a tag may be used to replace at least part of a value of the tag. The masking value may include any symbols and/or characters. For example, the masking value may include a letter, a number, a punctuation, a pattern, or the like, or any combination thereof. The masking value may be a default value, a random value, or the like. The processing device 120 may obtain the masking template based on the at least one masking mode and the at least one masking value. In some embodiments, the masking template may include at least one masking mode for at least one tag of a plurality of tags of the at least one original file. For example, a masking mode for a tag may include replacing at least part of a value of the tag with one or more masking values.

In some embodiments, the masking template may include one or more tags of the at least one original file, one or more masking modes corresponding to the one or more tags, and one or more masking values corresponding to the one or more masking modes. Each masking mode of the one or more masking modes may correspond to a tag of the one or more tags of the at least one original file. The masking modes of different tags may be the same or different. The masking values corresponding to different masking modes may be the same or different.

In some embodiments, the masking template may be previously determined by a user of the medical system 100, or one or more components (e.g., the processing device 120) of the medical system 100 according to different situations. In some embodiments, the processing device 120 may obtain a template setting request from a user. The template setting request may be a request for setting a masking template. The processing device 120 may cause a terminal device to display a template setting interface. The user may determine one or more masking parameters of the masking template via the template setting interface. The masking parameter may include a masking mode, a masking value, a masking type, a masking period, or the like, or any combination thereof.

Figure 9:
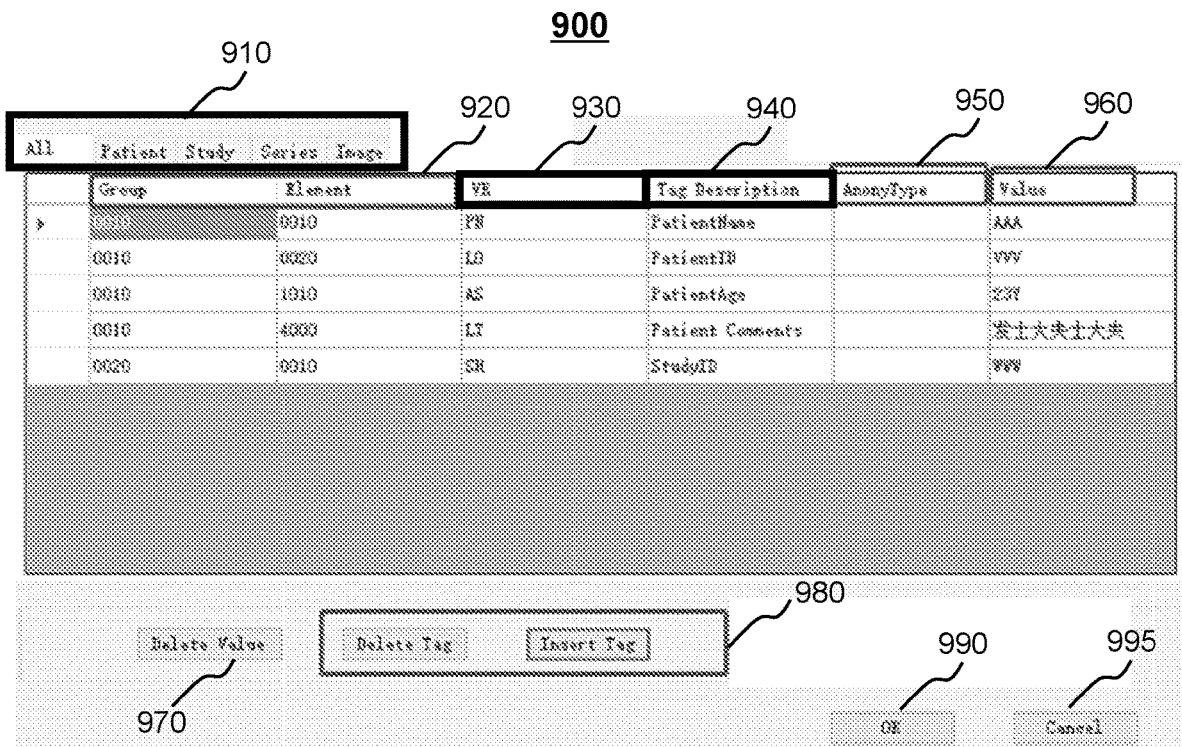
FIG. 9 is a schematic diagram illustrating an exemplary template setting interface according to some embodiments of the present disclosure.

In some embodiments, after the processing device 120 obtains the template setting request from the user, the processing device 120 may cause the terminal device to display a plurality of tags of the at least one original file. The processing device 120 may obtain a tag editing request from the user. The tag editing request may include deleting a tag from the plurality of tags, adding a tag in the plurality of tags, or the like, or any combination thereof. For example, the user may input the tag editing request via a delete tag button (e.g., a delete tag button as illustrated in FIG. 9) and/or an insert tag button (e.g., an insert tag button as illustrated in FIG. 9) in the template setting interface. As another example, the user may input the tag editing request via a voice. After one or more tags are selected from the plurality of tags of the at least one original file, one or more masking modes for the one or more selected tags, and one or more masking values corresponding to the one or more masking modes may be determined. The masking template for the at least one original file may be generated based on the one or more selected tags, one or more masking modes for the one or more sleeted tags, and one or more masking values corresponding to the one or more masking modes. In some embodiments, the masking template may be stored in the format of an extensible markup language (XML) file.

FIG. 9 is a schematic diagram illustrating an exemplary template setting interface according to some embodiments of the present disclosure. As illustrated in FIG. 9, a template setting interface 900 may include one or more user interface elements for presenting information associated with a masking template. For example, the template setting interface 900 may include a tag section 910 for presenting one or more tags (e.g., "all tags," "tags of a patient level," "tags of a study level," "tags of a series level," "tags of an image level") that can be selected by the user to edit one or more masking modes for the one or more tags. A tag 920 may include a group number and an element number. The tag 920 may correspond to a VR 930 and a tag description 940. The template setting interface 900 may also include an anonytype editing section 950 (also referred to as a masking mode editing section) for presenting a masking mode for a tag. The user may input or select a masking mode for a tag via the anonytype editing section 950. The template setting interface 900 may further include a masking value editing section 960 for presenting a masking value corresponding to a masking mode. The user may input or select a masking value corresponding to a masking mode for a tag via the masking value editing section 960. For example, the user may select a specific tag in the tag section 910. The user may input a masking mode for the specific tag via the anonytype editing section 950. The user may input a masking value corresponding to the masking mode for the specific tag via the masking value editing section 960.

The template setting interface 900 may further include a value option section 970 that can be selected by the user to delete a masking value. The template setting interface 900 may further include a tag editing section 980 that can be selected by the user to delete or insert a tag. The tag editing section 980 may include a delete tag button and an insert tag button. The delete tag button may be used for deleting a tag in the masking template. The insert tag button may be used for adding a tag in the masking template. For example, the user may delete (or insert) a tag by clicking the delete tag button (or the insert tag button) in the tag editing section 980 via a mouse. The template setting interface 900 may further include a button 990 that can be selected by the user to confirm the setting of the masking template. The template setting interface 900 may further include a button 995 that can be selected by the user to cancel the setting of the masking template.

Traditionally, one or more tags of at least one original file may be masked based on a same masking mode, which may lead to low efficiency and low flexibility of data masking. According to some embodiments of the present disclosure, the masking template including one or more masking modes for one or more tags of the at least one original file may be flexibly set according to a user preference and/or a masking demand, and the one or more tags in the at least one original file may be masked based on the masking template, which may improve the efficiency and flexibility of data masking. In some embodiments, the masking template may include a plurality of different masking modes for a plurality of tags of the at least one original file, and values of the plurality of tags may be masked using the masking template at the same time, which may improve the efficiency and flexibility of data masking.

In some embodiments, the processing device 120 may verify the at least one masking value in the masking template. In some embodiments, the format of the masking value corresponding to the masking mode for the tag may need to satisfy the data type of the tag. The format of the masking value may include a character type (e.g., a letter, a number, a punctuation, a pattern) of a character in the masking value, a character count in the masking value, or the like. Table 1 shows exemplary value representations (also referred to as data types) of a tag. As shown in Table 1, a VR may correspond to a character repertoire and a length of value. The character repertoire and the length of value corresponding to the VR may define the format of the masking value corresponding to the masking mode for the tag corresponding to the VR. For example, if a data type of a tag of patient ID is LO, character count of a masking value corresponding to a masking mode for the tag of patient ID cannot be greater than 64. As another example, if a data type of a tag of study date is DA, character counts of a masking value corresponding to a masking mode for the tag of study date can only be 8, and the characters of the masking value corresponding to the masking mode for the tag of study date can only contain numbers (e.g., 0-9).

TABLE 1

Exemplary value representations (VRs) of a tag

| VR | Definition | Character Repertoire | Length of Value |
|---|---|---|---|
| PN (Person Name) | Patient name with caret "^" as the separator, such as "SMITH^JOHN." | — | 64 characters maximum |
| CS (Code String) | String of characters with leading or trailing spaces being non-significant. | Uppercase characters, "0"-"9", the SPACE character, and underscore "_" | 16 characters maximum |
| SH (Short String) | A short string, such as: phone number, ID, etc. | — | 16 characters maximum |
| LO (Long String) | A character string that may be padded with leading and/or trailing spaces. | — | 64 characters maximum |
| UI (Unique Identifier, UID) | A character string containing a UID that is used to uniquely identify a wide variety of items, such as "1.2.840.1008.1.1." | "0"-"9" and "." | 64 characters maximum |
| DA (Date) | A string of characters of the format YYYYMMDD; where YYYY shall contain year, MM shall contain the month, and DD shall contain the day, such as "2050822." | "0"-"9" | 8 characters fixed |

In some embodiments, for each masking value of the at least one masking value corresponding to the at least one masking mode in the masking template, the processing device 120 may obtain a data type of a tag. The processing device 120 may determine whether the masking value satisfies the data type of the tag. In response to determining that the masking value satisfies the data type of the tag, the processing device 120 may determine that the masking value as a verified masking value. The processing device 120 may determine the masking template based on the verified masking value. In response to determining that the masking value does not satisfy the data type of the tag, the processing device 120 may generate a reminder. The reminder may be in the form of text, voice, a picture, a video, a haptic alert, or the like, or any combination thereof. In some embodiments, the reminder may indicate existence of the situation that masking value does not satisfy the data type of the tag and/or which portion of the masking value does not satisfy the data type of the tag. The processing device 120 (or the user) may modify the masking value. The processing device 120 may verify a modified masking value until it is determined that the modified masking value satisfies the data type of the tag. The processing device 120 may determine the modified masking value as a verified masking value. The processing device 120 may determine the masking template based on the verified masking value.

Accordingly, by verifying the masking value in the masking template to ensure that the format of the masking value corresponding to the masking mode for the tag satisfies the data type of the tag, which may guarantee the accuracy and rationality of the masking template, and may improve the accuracy and efficiency of the data masking process.

In 530, the processing device 120 (e.g., the masking module 430) may mask the data in the at least one original file based on the masking template, to generate at least one target file.

In some embodiments, the processing device 120 may obtain a masking request from a user. For example, the user may send the masking request to the processing device 120 by clicking one or more keys and/or buttons (e.g., the button 850 as illustrated in FIG. 8) in a query interface (e.g., the query interface 800 as illustrated in FIG. 8) via a mouse. The processing device 120 may mask the data in the at least one original file based on the masking request according to the masking template.

In some embodiments, for each tag of a plurality of tags in the at least one original file, the processing device 120 may mask (e.g., modify) at least part of a value of the tag based on a masking value corresponding to a corresponding masking mode for the tag in the masking template. In some embodiments, the value of the tag may include a plurality of characters (e.g., a mark, a sign, a symbol, a letter, a Chinese character). The processing device 120 may mask (e.g., modify) one or more characters of the plurality of characters of the value of the tag based on the masking value corresponding to the masking mode for the tag. For example, the processing device 120 may replace one or more characters of the plurality of characters of the value of the tag with the masking value corresponding to the masking mode for the tag. Further, the processing device 120 may generate the at least one target file based on at least one masked value (e.g., modified value) of the at least one tag of the plurality of tags.

In some embodiments, a first masking mode may be that all characters of the value of the tag are masked (e.g., modified) based on the masking value corresponding to the masking mode for the tag. For example, if a value of a tag of patient name in an original file is "Wang^Xiaohong," and a masking value corresponding to a masking mode for the tag of patient name is "anonymity," the processing device 120 may modify the value of the tag of patient name from "Wang^Xiaohong" to "anonymity." That is, the value of the tag of patient name in a target file is "anonymity."

In some embodiments, a second masking mode may be that one or more characters of the plurality of characters of the value of the tag are masked (e.g., modified) based on the masking value (e.g., a default value) corresponding to the masking mode for the tag. For example, if a value of a tag of patient name in an original file is "Wang^Xiaohong," and a masking value corresponding to a masking mode for the tag of patient name is "*," the processing device 120 may replace one or more characters of the plurality of characters of the value of the tag of patient name with the masking value "*." In some embodiments, the second masking mode may indicate which characters of the plurality of characters of the value of the tag needs to be replaced with the masking value "*." In some embodiments, the second masking mode may indicate that one or more characters corresponding to the last name of patient in the value of the tag of patient name need to be replaced with the masking value "*." For example, the processing device 120 may modify the value of the tag of patient name from "Wang^Xiaohong" to "****^Xiaohong." In some embodiments, the second masking mode may indicate that one or more characters corresponding to the first name of patient in the value of the tag of patient name need to be replaced with the masking value "*." For example, the processing device 120 may modify the value of the tag of patient name from "Wang^Xiaohong" to "Wang^******," "Wang^hong," or "Wang^Xiao," "Wang^Xi****," or the like. In some embodiments, the second masking mode may indicate that the first two characters in the value of the tag of patient name need to be replaced with the masking value "*." For example, the processing device 120 may modify the value of the tag of patient name from "Wang^Xiaohong" to "**ng^Xiaohong." In some embodiments, the one or more characters of the plurality of characters of the value of the tag of patient name may be replaced with the masking value "*" randomly. For example, the processing device 120 may modify the value of the tag of patient name from "Wang^Xiaohong" to "W*n*^Xia**ong."

In some embodiments, a third masking mode may be that one or more characters of the plurality of characters of the value of the tag are masked (e.g., modified) based on the masking value (e.g., a random value) corresponding to the masking mode for the tag. For example, if a value of a tag of patient name in an original file is "Wang^Xiaohong," and a masking value corresponding to a masking mode for the tag of patient name is a random value, the processing device 120 may modify the value of the tag of patient name from "Wang^Xiaohong" to a randomly generated value such as "ABcd^12387," "dfji^hu78," or the like. That is, the value of the tag of patient name in a target file is "ABcd^12387," "dfji^hu78," or the like.

In some embodiments, the processing device 120 may identify a language type of a value of a tag in the at least one original file. The language type may include the Chinese language, the English language, the French language, the Italian language, or the like. The processing device 120 may mask the value of the tag based on the language type of the value of the tag in the at least one original file and the masking mode for the tag. For example, if the value of the tag of patient name are Chinese characters, and the masking mode is that replacing the last name of patient in the value of the tag of patient name with a masking value, the processing device 120 may replace the first Chinese character or the first two Chinese characters in the value of the tag of patient name with the masking value. As another example, if the value of the tag of patient name are English characters, and the masking mode is that replacing the last name of patient in the value of the tag of patient name with a masking value, the processing device 120 may replace a plurality of characters corresponding the last name of the patient in the value of the tag of patient name with one or more masking values.

In some embodiments, different target files may be generated by masking a same original file based on different masking modes (e.g., the first masking mode, the second masking mode, the third masking mode) and corresponding masking values. That is, masked data in different target files generated by masking a same original file based on different masking modes and corresponding masking values may be different.

In some embodiments, a corresponding target file may be generated by masking an original file based on at least one masking mode (e.g., the first masking mode, the second masking mode, the third masking mode). A plurality of copy files of the corresponding target file may be generated and uploaded to a plurality of terminals (e.g., the terminal 140). A user may obtain a copy file of the corresponding target file from at least one terminal of the plurality of terminals based on a type of the terminal (e.g., the mobile device 141, the tablet computer 142, the laptop computer 143, etc.), a location of the user, an actual requirement, or the like.

It should be noted that the masking modes and the masking values described above are merely provided for the purposes of illustration, and not intended to limit the scope of the present disclosure. The masking template may include other masking modes. The value of the tag in the original file may be modified to any other form of masking value.

In 540, the processing device 120 (e.g., the storing module 440) may store the at least one target file based on the hierarchical relationship.

In some embodiments, the processing device 120 may generate a plurality of target files by masking a plurality of original files using a masking template. The processing device 120 may store the plurality of target files based on a hierarchical relationship associated with the data in the plurality of original files (e.g., a tag-based hierarchical relationship of a plurality of tags of the plurality of original files). For example, the plurality of original files may be stored in a first folder in a first database (e.g., the PACS) of the medical system 100. The first folder may include a plurality of first-level directories A1. Each first-level directory A1 may correspond to a patient. That is, one or more original files (of the plurality of original files) associated with a specific patient may be stored in a corresponding first-level directory A1. Each first-level directory A1 may include one or more second-level directories B1. Each second-level directory B1 may correspond to a study of a patient. That is, one or more original files (of the plurality of original files) associated with a specific study of the patient may be stored in a corresponding second-level directory B1 of the first-level directory A1. Each second-level directory B1 may include one or more third-level directories C1. Each third-level directory C1 may correspond to a series of a study of a patient. That is, one or more original files (of the plurality of original files) associated with a specific series of the study of the patient may be stored in a corresponding third-level directory C1 of the second-level directory B1 of the first-level directory A1.

After the plurality of original files are masked based on the masking template to generate the plurality of target files, the processing device 120 may generate a second folder in a second database (e.g., the PACS) of the medical system 100. The second database may be the same as or different from the first database. In some embodiments, the second database may include a plurality of first-level directories A2. Each first-level directory A2 in the second database may correspond to a first-level directory A1 in the first database. One or more target files corresponding to one or more original files that is stored in the first-level directory A1 in the first database may be stored in a corresponding first-level directory A2 in the second database. As used herein, "a target file corresponding to an original file" refers to that the target file is generated by masking the original file. Each first-level directory A2 may include one or more second-level directories B2. Each second-level directory B2 in the second database may correspond to a second-level directory B1 in the first database. One or more target files corresponding to one or more original files that is stored in the second-level directory B1 in the first database may be stored in a corresponding second-level directory B2 in the second database. Each second-level directory B2 may include one or more third-level directories C2. Each third-level directory C2 in the second database may correspond to a third-level directory C1 in the first database. One or more target files corresponding to one or more original files that is stored in the third-level directory C1 in the first database may be stored in a corresponding third-level directory C2 in the second database.

In a traditional way, after value(s) of tag(s) other than an UID tag of an original file (e.g., a DICOM file) is modified in a data masking process and a target file is generated, since a value of the UID tag of the target file is the same as the value of the UID tag of the original file, which may violate the UID uniqueness principle of the DICOM file. When the target file is archived to a database (e.g., a PACS) containing the original file, archiving problems caused by duplicate UIDs may occur. In addition, in the traditional way, if values of the UID tag of a plurality of original files are modified in the data masking process and a plurality of target files are generated, since the hierarchical relationship associated with the data in the plurality of original files is unknown, the data in the plurality of target files may lose their hierarchical relationship. According to some embodiments of the present disclosure, the hierarchical relationship associated with the data in the plurality of target files may be the same as the hierarchical relationship associated with the data in the plurality of original files. The hierarchical relationship associated with the data in the plurality of target files may be unambiguous, thereby avoiding confusion of data in the plurality of target files. In addition, the time required for data masking may be saved, and the efficiency of data masking may be improved.

In some embodiments, the processing device 120 may determine a mapping relationship between the data in the original file and the data in the target file. For example, the processing device 120 may determine the mapping relationship between the data in the original file and the data in the target file by associating a value of a tag (e.g., a tag of SOP UID) in the original file with a masked value of the tag (e.g., the tag of SOP UID) in the target file. In some embodiments, the processing device 120 may record the mapping relationship between the data in the original file and the data in the target file in a table in the database (e.g., the PACS) of the medical system 100. In some embodiments, the processing device 120 may obtain the original file based on the target file and the mapping relationship between the data in the original file and the data in the target file.

In some embodiments, after the at least one target file is generated, the at least one original file may be deleted, which may save the storage space of the database of the medical system 100.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

In some embodiments, the processing device 120 may obtain a plurality of original files. The processing device 120 may obtain a masking template for the data in the plurality of original files. The masking template may include a plurality of tags of the plurality of original files, a plurality of masking modes corresponding to the plurality of tags, and a plurality of masking values corresponding to the plurality of masking modes. The processing device 120 may mask the data in the plurality of original file based on the masking template, to generate a plurality of target files. For example, for each tag of the plurality of tags, the processing device 120 may modify at least part of a value of the tag based on a masking value corresponding to a corresponding masking mode for the tag. The processing device 120 may generate the plurality of target files based on a plurality of modified values of the plurality of tags. According to some embodiments of the present disclosure, the plurality of original files may be masked using the masking template simultaneously, which may improve the efficiency of data masking. The data masking needs in many fields such as clinical medical teaching, medical communication, and artificial intelligence medical research may be satisfied.

In some embodiments, the processing device 120 may obtain at least one processed target file by performing a format conversion operation on the at least one target file. In some embodiments, the processing device 120 may perform the format conversion operation on the at least one target file according to one or more file format conversion algorithms. In some embodiments, the one or more file format conversion algorithms may be stored in a DICOM library. The file format conversion algorithms may include algorithms for converting a file of a DICOM format into a file of a BMP format, a JPG format, a PNG format, a TIFF format, or the like. For example, the processing device 120 may convert a target file of a DICOM format to a processed target file of a BMP format, a JPG format, a PNG format, a TIFF format, or the like.

In some embodiments, the processing device 120 may export the at least one target file and/or at least one processed target file. For example, the processing device 120 may export the at least one target file and/or at least one processed target file to a local disk, a mobile hard disk, a tape library, a network shared disk, or the like. As another example, the processing device 120 may export the at least one target file and/or at least one processed target file to a PowerPoint (PPT) document, a Word document, or the like.

In some embodiments, the processing device 120 may store the at least one target file and/or the at least one processed target file in a shared storage space. The storage space may include a local disk, a mobile hard disk, a tape library, a network shared disk, or the like.

Figure 10:
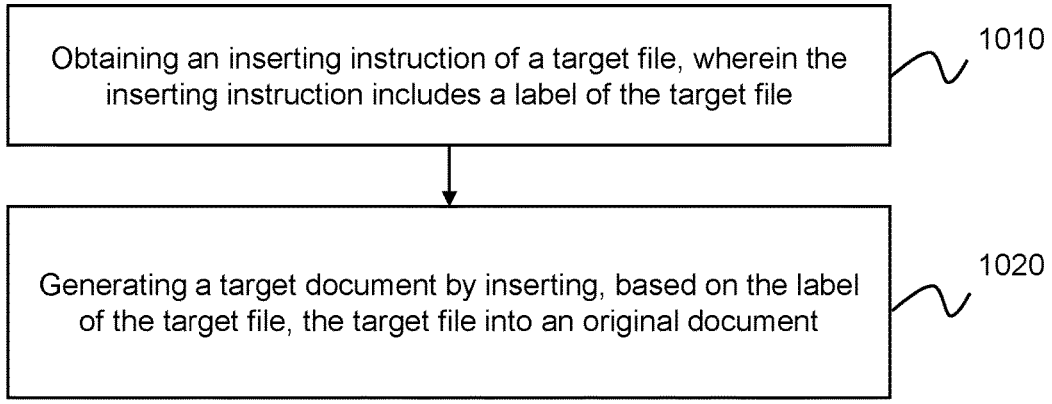
FIG. 10 is a flowchart illustrating an exemplary process for generating a target document according to some embodiments of the present disclosure.

FIG. 10 is a flowchart illustrating an exemplary process for generating a target document according to some embodiments of the present disclosure. In some embodiments, process 1000 may be executed by the medical system 100. For example, the process 1000 may be implemented as a set of instructions (e.g., an application) stored in a storage device (e.g., the storage device 130, the storage device 220, and/or the storage 390). In some embodiments, the processing device 120 (e.g., the processor 210 of the computing device 200, the CPU 340 of the mobile device 300, and/or one or more modules illustrated in FIG. 4) may execute the set of instructions and may accordingly be directed to perform the process 1000. The operations of the illustrated process presented below are intended to be illustrative. In some embodiments, the process 1000 may be accomplished with one or more additional operations not described and/or without one or more of the operations discussed. Additionally, the order of the operations of process 1000 illustrated in FIG. 10 and described below is not intended to be limiting.

In 1010, the processing device 120 (e.g., the storing module 440) may obtain an inserting instruction of a target file.

In some embodiments, the processing device 120 may obtain the inserting instruction of the target file from a user. The inserting instruction of the target file may be a request for inserting the target file in a document. In some embodiments, the inserting instruction may include a label of the target file. The label of the target file may indicate that data in the target file has been masked. The label may include a letter, a number, a punctuation, or the like, or any combination thereof. In some embodiments, different target files may correspond to different labels.

In 1020, the processing device 120 (e.g., the storing module 440) may generate a target document by inserting, based on the label of the target file, the target file into an original document.

In some embodiments, the original document may include a PowerPoint (PPT) document, a Word document, or the like. In some embodiments, the processing device 120 may call a document interface to insert the target file into a target position in the original document based on the label of the target file included in the inserting instruction. In some embodiments, the target document may include one or more files of the original document and the target file.

According to some embodiments of the present disclosure, the target document may be generated by inserting the target file into the original document, which may facilitate usage including, e.g., clinical teaching, academic exchange and presentation, and/or image editing.

Figure 11:
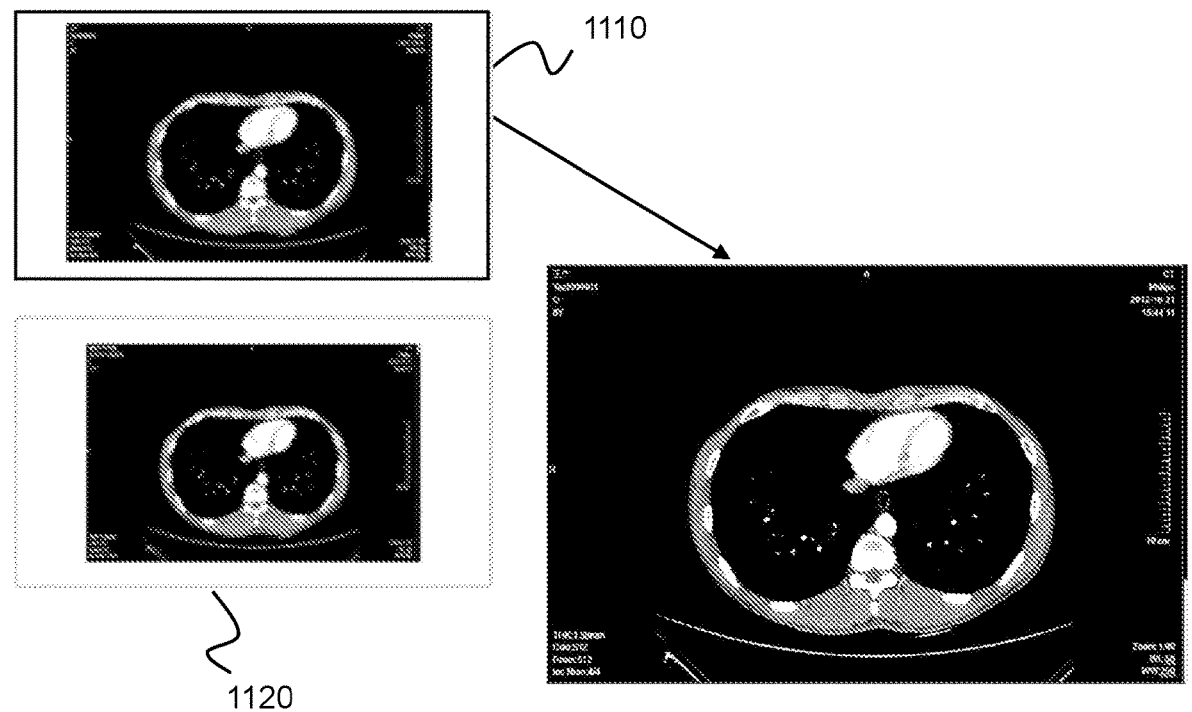
FIG. 11 is a schematic diagram illustrating an exemplary target document according to some embodiments of the present disclosure.

FIG. 11 is a schematic diagram illustrating an exemplary target document according to some embodiments of the present disclosure. As illustrated in FIG. 11, a target document 1100 (e.g., a PowerPoint (PPT) document) includes a first target file 1110 (e.g., a CT image) and a second target file 1120 (e.g., a CT image). A patient name in the first target file 1110 is masked by "Wang**."

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "module," "unit," "component," "device," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claim subject matter lie in less than all features of a single foregoing disclosed embodiment.

What is claimed is:

1. A method for data masking, which is implemented on a computing device including at least one processor and at least one storage device, comprising:
   obtaining at least one original file and a hierarchical relationship, the at least one original file including a plurality of tags, and the hierarchical relationship being associated with a relationship of the plurality of tags;
   obtaining a masking template, the masking template including at least one masking mode for at least one tag of the plurality of tags;
   masking at least one value of the at least one tag of the plurality of tags in the at least one original file based on the masking template, to generate at least one target file corresponding to the at least one original file; and
   storing the at least one target file based on the hierarchical relationship.

2. The method of claim 1, wherein the obtaining at least one original file comprises:
   obtaining a file search query from a user; and
   obtaining the at least one original file based on the file search query.

3. The method of claim 1, wherein the obtaining a masking template comprises:
   obtaining at least one masking value corresponding to the at least one masking mode; and
   obtaining the masking template based on the at least one masking mode and the at least one masking value.

4. The method of claim 3, wherein the plurality of tags are configured to describe identification information related to the at least one original file, and the the masking the least one value of the at least one tag of the plurality of tags in the at least one original file based on the masking template, to generate at least one target file corresponding to the at least one original file comprises:
   for each tag of the at least one tag of the plurality of tags, modifying at least part of the value of the tag based on a masking value corresponding to a corresponding masking mode for the tag; and
   generating the at least one target file based on at least one modified value of the at least one tag of the plurality of tags.

5. The method of claim 4, further comprising:
   verifying the at least one masking value in the masking template.

6. The method of claim 5, wherein the verifying the at least one masking value in the masking template comprises:
   for each masking value of the at least one masking value in the masking template,
      obtaining a data type of the value of a tag; and
      determining whether the masking value satisfies the data type of the tag; and
      in response to determining that the masking value satisfies the data type of the tag, determining that the masking value as a verified masking value.

7. The method of claim 1, further comprising:
   obtaining at least one processed target file by performing a format conversion operation on the at least one target file; and
   exporting the at least one processed target file.

8. The method of claim 1, further comprising:
   storing the at least one target file in a shared storage space.

9. The method of claim 1, wherein the at least one original file includes a digital imaging and communications in medicine (DICOM) file.

10. The method of claim 1, wherein the masking template includes a plurality of masking modes for the at least one tag of the plurality of tags, and at least two masking modes of the plurality of masking modes are different.

11. A system for data masking, comprising:
   at least one storage device including a set of instructions; and
   at least one processor configured to communicate with the at least one storage device, wherein when executing the set of instructions, the at least one processor is configured to direct the system to perform operations including:
      obtaining at least one original file and a hierarchical relationship, the at least one original file including a plurality of tags, and the hierarchical relationship being associated with a relationship of the plurality of tags;
      obtaining a masking template, the masking template including at least one masking mode for at least one tag of the plurality of tags;
      masking at least one value of the at least one tag of the plurality of tags in the at least one original file based on the masking template, to generate at least one target file corresponding to the at least one original file; and
      storing the at least one target file based on the hierarchical relationship.

12. The system of claim 11, wherein the obtaining at least one original file comprises:
   obtaining a file search query from a user; and
   obtaining the at least one original file based on the file search query.

13. The system of claim 11, wherein the obtaining a masking template comprises:
   obtaining at least one masking value corresponding to the at least one masking mode; and
   obtaining the masking template based on the at least one masking mode and the at least one masking value.

14. The system of claim 13, wherein the plurality of tags are configured to describe identification information related to the at least one original file, the masking the least one value of the at least one tag of the plurality of tags in the at least one original file based on the masking template, to generate at least one target file corresponding to the at least one original file comprises:
   for each tag of the at least one tag of the plurality of tags, modifying at least part of the value of the tag based on a masking value corresponding to a corresponding masking mode for the tag; and
   generating the at least one target file based on at least one modified value of the at least one tag of the plurality of tags.

15. The system of claim 14, wherein the at least one processor is configured to direct the system to perform operations including:
   verifying the at least one masking value in the masking template.

16. The system of claim 15, wherein the verifying the at least one masking value in the masking template comprises:
   for each masking value of the at least one masking value in the masking template,
      obtaining a data type of the value of a tag; and
      determining whether the masking value satisfies the data type of the tag; and
      in response to determining that the masking value satisfies the data type of the tag, determining that the masking value as a verified masking value.

17. The system of claim 11, wherein the at least one processor is configured to direct the system to perform operations including:
obtaining at least one processed target file by performing a format conversion operation on the at least one target file; and
exporting the at least one processed target file.

18. A non-transitory computer readable medium, comprising executable instructions that, when executed by at least one processor, direct the at least one processor to perform a method for motion correction, the method comprising:
obtaining at least one original file and a hierarchical relationship, the at least one original file including a plurality of tags, and the hierarchical relationship being associated with a relationship of the plurality of tags;
obtaining a masking template, the masking template including at least one masking mode for at least one tag of the plurality of tags;
masking at least one value of the at least one tag of the plurality of tags in the at least one original file based on the masking template, to generate at least one target file corresponding to the at least one original file; and
storing the at least one target file based on the hierarchical relationship.

19. The method of claim 1, further comprising:
obtaining a plurality of data elements in the at least one original file, each data element of the plurality of data elements corresponding to one of the plurality of tags and including at least one of a data type of the tag, a value length of the tag, or the value of the tag; and
masking the plurality of data elements based on the masking template.

20. The system of claim 11, wherein the at least one processor is configured to direct the system to perform operations further including:
obtaining a plurality of data elements in the at least one original file, each data element of the plurality of data elements corresponding to one of the plurality of tags and including at least one of a data type of the tag, a value length of the tag, or the value of the tag; and
masking the plurality of data elements based on the masking template.

* * * * *